(12) United States Patent
Taniguchi et al.

(10) Patent No.: US 7,243,270 B2
(45) Date of Patent: Jul. 10, 2007

(54) FAILURE PREDICTION SYSTEM, FAILURE PREDICTION PROGRAM, FAILURE PREDICTION METHOD, DEVICE PRINTER AND DEVICE MANAGEMENT SERVER

(75) Inventors: Shinya Taniguchi, Suwa (JP); Yusuke Takahashi, Suwa (JP)

(73) Assignee: Seiko Epson Corporation (JP)

( * ) Notice: Subject to any disclaimer, the term of this patent is extended or adjusted under 35 U.S.C. 154(b) by 604 days.

(21) Appl. No.: 10/742,699

(22) Filed: Dec. 19, 2003

(65) Prior Publication Data

US 2004/0181712 A1     Sep. 16, 2004

(30) Foreign Application Priority Data

Dec. 20, 2002 (JP) .............................. 2002-369790
Nov. 10, 2003 (JP) .............................. 2003-379508

(51) Int. Cl.
*G06F 11/00* (2006.01)

(52) U.S. Cl. ........................................ 714/44; 358/1.14

(58) Field of Classification Search ................... 714/44
See application file for complete search history.

(56) References Cited

U.S. PATENT DOCUMENTS

| | | | |
|---|---|---|---|
| 5,477,338 A | | 12/1995 | Fujii et al. |
| 5,710,723 A | * | 1/1998 | Hoth et al. .................. 702/181 |
| 5,768,495 A | * | 6/1998 | Campbell et al. .............. 714/25 |
| 5,835,816 A | | 11/1998 | Sawada et al. |
| 6,084,690 A | | 7/2000 | Takahashi |
| 6,199,018 B1 | * | 3/2001 | Quist et al. .................... 702/34 |
| 6,397,247 B1 | * | 5/2002 | Shirakawa et al. ........... 709/223 |
| 6,718,285 B2 | * | 4/2004 | Schwartz et al. ............. 702/184 |
| 6,782,495 B2 | * | 8/2004 | Bernklau-Halvor ........... 714/44 |
| 7,089,154 B2 | * | 8/2006 | Rasmussen et al. .......... 702/183 |

(Continued)

FOREIGN PATENT DOCUMENTS

EP     0 599 606 A2     11/1993

(Continued)

OTHER PUBLICATIONS

Communication from European Patent Office re: related application.

(Continued)

*Primary Examiner*—Scott Baderman
*Assistant Examiner*—Paul F. Contino
(74) *Attorney, Agent, or Firm*—Harness, Dickey & Pierce, P.L.C.

(57) ABSTRACT

There is provided a novel failure prediction system, a failure prediction program, a failure prediction method, a device, a printer and a device management server capable of accurately predicting a failure of a device connected on a network. A failure prediction system is provided with multiple devices and a device management server for managing the multiple devices via a network. Each of the devices is provided with a device diagnosis section for diagnosing the state of the device to notify diagnosis results; and the device management server is provided with a failure prediction section for predicting a device with a failure tendency based on the diagnosis results sent by each of the device diagnosis sections. Accordingly, it is possible to accurately predict not only a failure due to an expected factor but also a failure due to an unexpected factor.

17 Claims, 10 Drawing Sheets

U.S. PATENT DOCUMENTS

| | | | |
|---|---|---|---|
| 7,146,542 B2 * | 12/2006 | Srinivasan et al. | 714/44 |
| 7,149,936 B2 * | 12/2006 | Deshpande et al. | 714/57 |
| 2001/0038688 A1 * | 11/2001 | Suzuki | 379/156 |
| 2004/0225911 A1 * | 11/2004 | Smith | 714/4 |

FOREIGN PATENT DOCUMENTS

| JP | 2001-207399 | 8/2001 |
|---|---|---|
| JP | 2001-216432 | 8/2001 |

OTHER PUBLICATIONS

U.S. Appl. No. 10/747,815, filed Dec. 29, 2003.
U.S. Appl. No. 10/747,817, filed Dec. 29, 2003.
U.S. Appl. No. 10/747,814, filed Dec. 29, 2003.
U.S. Appl. No. 10/755,711, filed Jan. 9, 2004.

* cited by examiner

FIG. 9

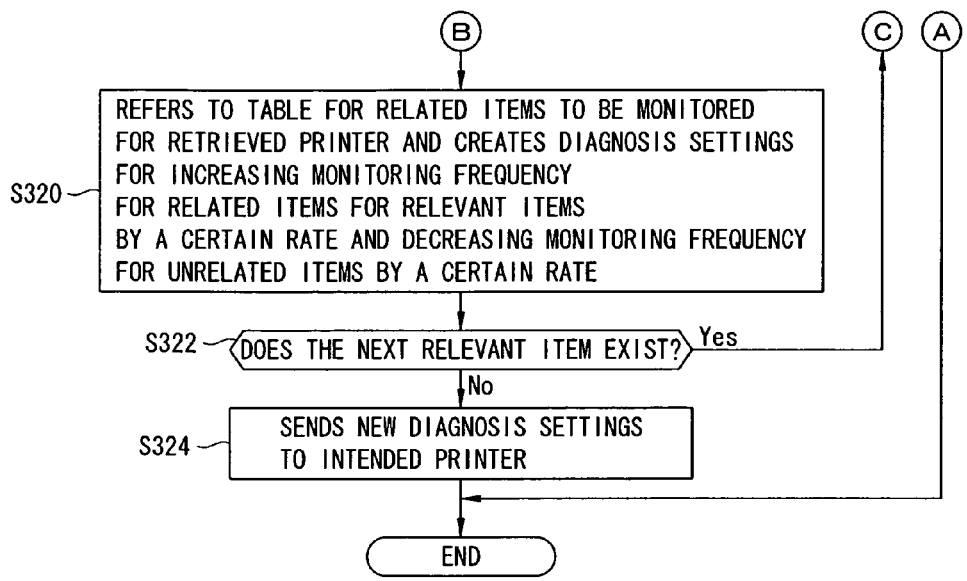

FIG. 10

| | POSITION TO BE DIAGNOSED | RELATED EVENT | VALUE |
|---|---|---|---|
| 100 | FEEDING CONDITION | NO PAPER | ACCUMULATED FREQUENCY |
| 101 | JAM A | COVER A OPEN | ACCUMULATED FREQUENCY |
| 102 | JAM B | COVER B OPEN | ACCUMULATED FREQUENCY |
| 103 | FEEDER | FEEDER OPEN | ACCUMULATED FREQUENCY |
| 104 | DISCHARGER | DISCHARGER OPEN | ACCUMULATED FREQUENCY |
| 105 | FEEDING MOTOR | MOTOR TEMPERATURE | NUMBER OF TIMES THRESHOLD TEMPERATURE 100°C WAS EXCEEDED |

| TIME | DESCRIPTION |
|---|---|
| 11/09/2002 09:10 | JAM A ERROR |
| 11/09/2002 10:10 | JAM A ERROR |
| 11/09/2002 12:10 | COVER A OPEN |
| 11/09/2002 20:00 | OFF-LINE |
| 11/10/2002 10:10 | FEEDER ERROR |
| 11/10/2002 12:30 | FEEDING MOTOR TEMPERATURE 60°C |
| 11/10/2002 12:45 | FEEDING MOTOR TEMPERATURE 110°C |

ACCUMULATED FREQUENCY OF JAM B ERROR

ACCUMULATED FREQUENCY OF JAM A ERROR

FIG. 15
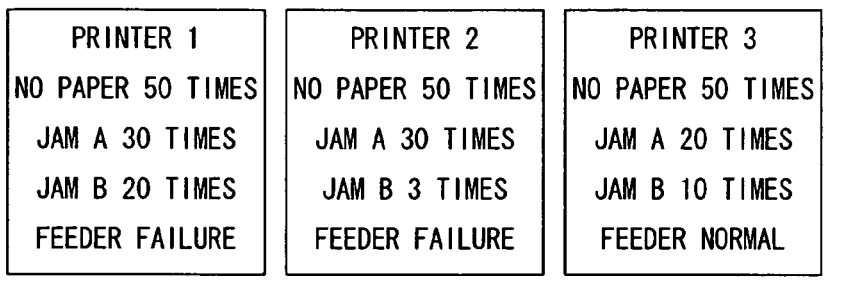
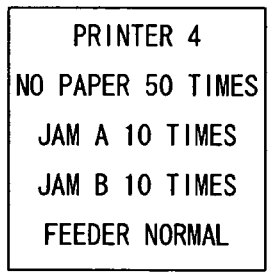
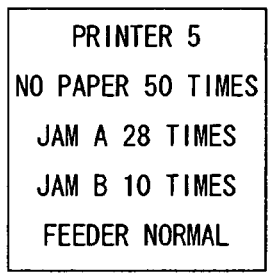
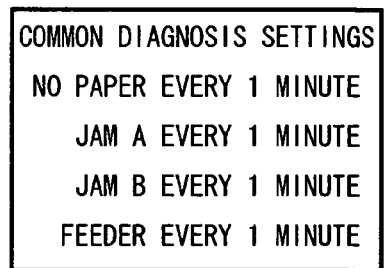
200
FIG. 16
201
| COMMON DIAGNOSIS SETTING | TIME INTERVAL |
|---|---|
| NO PAPER | EVERY 5 MINUTES |
| JAM A | EVERY 30 SECONDS |
| JAM B | EVERY 5 MINUTES |
| FEEDER | EVERY 30 SECONDS |
| FEEDING MOTOR | EVERY 1 MINUTE |

```
SETTINGS FOR PRINTER 5
   COVER A: CLOSED
   FEEDER : CLOSED
```

FAILURE PREDICTION SYSTEM, FAILURE PREDICTION PROGRAM, FAILURE PREDICTION METHOD, DEVICE PRINTER AND DEVICE MANAGEMENT SERVER

BACKGROUND OF THE INVENTION

1. Field of the Invention

The present invention relates to a failure prediction system for managing and monitoring multiple devices connected on a network, with a device management server, to predict a failure of the devices, a failure prediction program, a failure prediction method, a device, a printer and a device management server.

2. Description of the Related Art

Recently, a device, such as a printer and a copying machine, itself has increasingly been able to notify its condition by providing an application execution environment for the device.

In such an environment, it has been possible to perform various maintenance services as a business by collecting information of failures and errors of each device to one location via a network.

For example, there is conceived a service in which, by collecting diagnosis results of a failure condition and a usage for each of a large number of printers connected to a network, such as the Internet and an intranet, and predicting a printer that is likely to fail based on the diagnosis results, suitable maintenance services are provided for the printer before a failure occurs or a warning is given to the effect that a failure is predicted for the printer.

However, the method of predicting a printer that is likely to fail based on diagnosis results related to a failure condition, a usage and the like of a lot of printers, however, has a problem that it is impossible to cope with a failure caused due to an unexpected factor and, therefore, accurate prediction is difficult to make.

The present invention has been made in consideration of this unsolved problem of the prior-art techniques, and its object is to provide a novel failure prediction system enabling accurate prediction of a failure of a device connected on a network, a failure prediction program, a failure prediction method, a device, a printer and a device management server.

SUMMARY OF THE INVENTION

In order to solve the above-mentioned problem, a failure prediction system according to a first aspect comprises multiple devices and a device management server for managing the multiple devices via a network; wherein each of the multiple devices comprises device diagnosis section for diagnosing the device's own state to send first diagnosis results obtained by the diagnosis to the device management server; and the device management server comprises failure prediction section for recognizing a state related to a failure based on the first diagnosis results sent by the device diagnosis section of each of the devices, performing diagnosis as for the recognized state related to a failure, and predicting a device with a failure tendency based on second diagnosis results obtained by the diagnosis.

That is, the failure prediction system according to the present invention does not predict a device with a failure tendency from diagnosis results obtained by diagnosing each device only based on predetermined diagnosis settings, but predicts a device with a failure tendency from diagnosis results obtained by performing feedback of the above-mentioned diagnosis results to specify more optimal diagnosis settings.

As a result, it is possible not only to easily grasp an unexpected factor, such as an operation or a state related to a failure, but also to immediately utilize the results for new failure prediction. Therefore, it is possible to accurately predict a failure due to an unexpected factor as well as a failure due to an expected factor.

A "failure" in the present invention and in the inventions described below include not only a state in which the original function of a device as the device, for example, a printing function in the case of a printer is completely lost, but also an "abnormal" state such as a state in which a part of the function is lost and a state in which the function may be lost though printing is currently functioning, if the state is left as it is. That is, the "failure" in this invention and in the inventions described below includes a state which is not intended by the provider of the device or a state which should not be ignored, in addition to a concept of an ordinary failure. (The same is true for the description below).

The "system" in this invention means a form in which the device management server and multiple devices having various sections and functions to be described below organically act upon each other and includes a form in which other devices and servers, that is, devices and servers which are not provided with each of the section and functions defined below, are also connected on the same network. (The same is true for the description below).

A failure prediction system according to a second aspect comprises multiple devices and a device management server for managing the multiple devices via a network; wherein each of the multiple devices comprises device diagnosis section for diagnosing the device's own state with a first diagnosis program sent by the device management server to send first diagnosis results obtained by the diagnosis to the device management server; and the device management server comprises failure prediction section for recognizing a state related to a failure based on the first diagnosis results sent by the device diagnosis section of each of the devices, sending a second diagnosis program for performing diagnosis as for the recognized state related to a failure, to devices to be diagnosed as for the state related to a failure among the devices, and predicting a device with a failure tendency based on second diagnosis results notified by the second diagnosis program.

That is, the present invention diagnoses a device with the use of a diagnosis program sent by a device management server, and changes the diagnosis setting of the diagnosis program via a network as appropriate. This enables an effect similar to that of the first aspect to be easily achieved.

With regard to "sending a second diagnosis program to devices to be diagnosed as for the state related to a failure among the devices" mentioned herein, the following two cases are conceivable: the case where all the devices connected to a system are to be diagnosed and the case where particular selected devices are to be diagnosed. When all the devices are diagnosed, an effect of increase in the accuracy of prediction can be expected. Meanwhile, when particular selected devices are diagnosed, an effect of increase in the processing speed can be expected.

A failure prediction system according to a third aspect is:

the failure prediction system according to the first or second aspect; wherein the device diagnosis section of the device comprises: a communication part for providing a function of communicating with the device management server; a program execution part for executing first and second diagnosis programs for diagnosing the state of each part of the device; a storage part for preserving settings of the first and second diagnosis programs and the first and second diagnosis results; and a detection part for detecting the state of each part of the device.

By adopting such a configuration, it is possible for the device not only to accurately diagnose the status of its each part and send the diagnosis results to the device management server but also to easily receive new diagnosis settings to perform accurate failure diagnosis.

A failure prediction system according to a fourth aspect is: the failure prediction system according to the first or second aspect; wherein the failure prediction section of the device management server comprises: a communication part for providing a function of communicating with the device; a data processing part for creating failure occurrence tendency information showing a tendency of a state related to a failure based on the first diagnosis results sent by each of the devices and creating the second diagnosis program; a storage part for storing the information on the device and the diagnosis results; and a search part for searching for a device corresponding to the failure occurrence tendency information.

By adopting such a configuration, it is possible for the device management server to specify accurate diagnosis settings and create failure occurrence tendency information from the diagnosis results sent by each device according to the diagnosis settings and therefore to perform more accurate failure prediction.

A failure prediction system according to a fifth aspect is: the failure prediction system according to any of the first to fourth aspects; wherein each of the devices comprises operation restriction section for restricting a part or all of operations of the device in response to a signal from the device management server.

By adopting such a configuration, the user of the device cannot perform such an operation that may cause a failure and, therefore, a failure of the device can be prevented from occurring.

As a result, a repair cost required when a failure occurs can be reduced, which contributes cost reduction.

A failure prediction system according to a sixth aspect is: the failure prediction system according any of the first to fifth aspects; wherein each of the devices comprises warning section for giving a warning to the effect that a failure of the device is predicted or that operations are restricted, in response to a signal from the device management server.

Accordingly, the user of the device is prevented from performing such an operation that may cause a failure, and an effect similar to that of the invention 5 can be obtained.

A failure prediction system according to a seventh aspect is:

the failure prediction system according to any of the first to sixth aspects; wherein the device is a printer.

Accordingly, it is possible to accurately predict a failure for each printer connected on a network.

A failure prediction system according to an eighth aspect is:

the failure prediction system according any of the first to seventh aspects; wherein the diagnosis by each of the devices of the device's state is executed periodically.

That is, though diagnosis by each device of its own state may be performed every time the power is on, a processing load on each device can be reduced if the diagnosis is performed periodically. Especially, when the diagnosis is executed by a dedicated diagnosis program and hardware resources provided for the device is borrowed for use to execute the program, a more significant effect can be obtained. Furthermore, notification of an event enables information processing to be performed without confirmation of a state by a loop process in the program and therefore without delay in timing after a problem occurs.

A failure prediction system according to a ninth aspect is:

the failure prediction system according to any of the first to seventh aspects; wherein the diagnosis by each of the devices of the device's own state is performed when an event occurs.

That is, though diagnosis by each of the devices of the device's own state may be performed every time power is on, a processing load on each device can be reduced if it is performed when a predetermined event occurs as in this invention. Furthermore, as in the eighth aspect, especially when the diagnosis is performed by a dedicated diagnosis program and hardware resources provided for the device is borrowed for use to execute the program, a more significant effect can be obtained. Furthermore, notification of an event enables information processing to be performed without confirmation of a state by a loop process in the program and therefore without delay in timing after a problem occurs.

A failure prediction system according to a tenth aspect is:

the failure prediction system according to any of the first to ninth aspects; wherein the notification by each of the devices of the results of diagnosis of the device's own state to the device management server is periodically performed.

That is, though diagnosis results maybe notified by each device to a device management server every time diagnosis is performed, a processing load on each device or network traffic can be reduced if information accumulated in the device is collectively and periodically notified as in this invention.

A failure prediction system according to an eleventh aspect is:

the failure prediction system according to any of the first to tenth aspects; wherein the finding of a state related to a failure by the failure prediction section of the device management server is performed based on a process leading to a failure of the device.

By utilizing a process leading to a failure as information for analyzing a cause of a failure as in this invention, it is possible to easily find a cause of a failure due to an unexpected factor.

A device according to a twelfth aspect is:

a device to be managed by a device management server via a network, the device comprising:

device diagnosis section for diagnosing the device's own state to notify the device management server of diagnosis results obtained by the diagnosis via the network.

Thus, the device itself can automatically notify its own state to the device management server and thereby receive suitable measures from the device management server.

A device according to a thirteenth aspect is:

the device according to the twelfth aspect, the device comprising operation restriction section for restricting operations of the device in response to a signal from the device management server.

By providing the operation restriction section for restricting a part or all of operations of the device in response to a signal from the device management server, the user of the device cannot perform such an operation that may cause a failure and, therefore, a failure of the device can be prevented from occurring. As a result, as in the invention 5, a repair cost required when a failure occurs can be reduced, which contributes to cost reduction.

A device according to a fourteenth aspect is:

the device according to the twelfth or thirteenth aspect, the device comprising warning section for giving a warning to the effect that a failure of the device is predicted or that operations are restricted, in response to a signal from the device management server.

Accordingly, the user of the device cannot perform such an operation that may cause a failure, and an effect similar to that of the thirteenth aspect can be obtained.

A printer according to a fifteenth aspect is:

a printer to be managed by a device management server via a network; the printer comprising: device diagnosis section for diagnosing the printer's own state to notify the device management server of diagnosis results obtained by the diagnosis via the network.

Accordingly, the printer itself can automatically and surely notify the state of its own printing function and the like to the device management server and thereby receive suitable measures from the device management server.

A device management server according to a sixteenth aspect is:

a device management server for managing multiple devices via a network, the device management server comprising:

failure prediction section for recognizing a state related to a failure based on diagnosis results obtained by diagnosis and sent by each of the devices, performing diagnosis as for the recognized state related to a failure, and predicting a device with a failure tendency based on diagnosis results obtained by the diagnosis.

Accordingly, it is possible not only to easily grasp an unexpected factor, such as an operation and a state related to a failure, but also to immediately utilize the grasped results for new failure prediction, and therefore, it is possible to accurately predict a failure due to an unexpected factor as well as a failure due to an expected factor.

A failure prediction program according to a seventeenth aspect is:

a failure prediction program for realizing a failure prediction system comprising multiple devices and a device management server for managing the multiple devices via a network, with a computer; wherein each of the multiple devices comprises device diagnosis section for diagnosing the device's own state to send first diagnosis results obtained by the diagnosis to the device management server; and the device management server comprises failure prediction section for recognizing a state related to a failure based on the first diagnosis results sent by the device diagnosis section of each of the devices, performing diagnosis as for the recognized state related to a failure, and predicting a device with a failure tendency based on second diagnosis results obtained by the diagnosis.

Accordingly, it is possible to obtain an effect similar to that of the first aspect and to realize accurate failure prediction for a device on a network, and therefore it is possible to easily and economically realize failure prediction in comparison with realization by manufacturing dedicated hardware. Furthermore, the function can be easily altered and improved only by changing a part of description of the program.

A failure prediction program according to an eighteenth aspect is:

the failure prediction program for realizing a failure prediction system comprising multiple devices and a device management server for managing the multiple devices via a network, with a computer; wherein each of the multiple devices comprises device diagnosis section for diagnosing the device's own state with a first diagnosis program sent by the device management server to send first diagnosis results obtained by the diagnosis to the device management server; and the device management server comprises failure prediction section for recognizing a state related to a failure based on the diagnosis results sent by the device diagnosis section of each of the devices, sending a second diagnosis program for performing diagnosis as for the recognized state related to a failure to each of the devices, and predicting a device with a failure tendency based on diagnosis results notified by the second diagnosis program.

Accordingly, it is possible to obtain an effect similar to that of the second aspect and realize failure prediction on software as in the seventeenth aspect, and therefore it is possible to easily and economically realize failure prediction of the device.

A failure prediction program according to a nineteenth aspect is:

the failure prediction program according to the seventeenth or eighteenth aspect; wherein the device diagnosis section of the device comprises: a communication part for providing a function of communicating with the device management server; a program execution part for executing a diagnosis program for diagnosing the state of each part of the device; a storage part for preserving settings of the diagnosis program and the first diagnosis results; and a detection part for detecting the state of each part of the device.

Accordingly, an effect similar to that of the third, seventeenth and eighteenth aspects can be obtained.

A failure prediction program according to a twentieth aspect is:

the failure prediction program according to any of the seventeenth to nineteenth aspects; wherein the failure prediction section of the device management server comprises: a communication part for providing a function of communicating with the device; a data processing part for creating failure occurrence tendency information based on the diagnosis results sent by each of the devices and creating the second diagnosis program; a storage part for storing the information on the device and the diagnosis results; and a search part for searching for a device corresponding to the failure occurrence tendency information.

Accordingly, an effect similar to that of the fourth, seventeenth and eighteenth aspects can be obtained.

A failure prediction method according to a twenty-first aspect is:

the failure prediction method for diagnosing the state of multiple devices connected to a network, recognizing a state related to a failure based on results of the diagnosis of the multiple devices, performing diagnosis as for the state related to a failure, and predicting a device with a failure tendency based on the diagnosis results.

Accordingly, as in the first aspect, it is possible not only to easily grasp an unexpected factor but also to immediately utilize the results for new failure prediction. Therefore, it is possible to accurately predict a failure due to an unexpected factor as well as a failure due to an expected factor.

A failure prediction method according to a twenty-second aspect is:

the failure prediction method for diagnosing the state of multiple devices connected to a network with a first failure diagnosis program provided in each of the devices, recognizing a state related to a failure based on results of diagnosis by each first failure diagnosis program, sending to each of the devices a second diagnosis program for performing diagnosis as for the state related to a failure, and predicting a device with a failure tendency based on diagnosis results notified by the second failure diagnosis program.

Accordingly, it is possible to easily achieve an effect similar to that of the first aspect only by changing diagnosis settings for the diagnosis program via the network as appropriate.

A failure prediction method according to a twenty-third aspect is:

the failure prediction method according to the twenty-first or twenty-second aspect; wherein when a device with a failure tendency is predicted, operations of the device with a failure tendency are stopped, or a warning is given to the user of the device after the prediction.

Accordingly, as in the fifth and sixth aspects, the user of the device cannot or does not perform such an operation that may cause a failure and, therefore, a failure of the device can be prevented from occurring.

A failure prediction method according to a twenty-fourth aspect is:

the failure prediction method according to any of the twenty-first to twenty-third aspects; wherein the diagnosis by each of the devices of the device's own state is periodically performed.

Accordingly, as in the eighth aspect, a processing load on each device can be reduced in comparison with the case diagnosis is performed every time power is on. Especially, when the diagnosis is performed by a dedicated diagnosis program and hardware resources provided for the device is borrowed for use to execute the program, a more significant effect can be obtained. Furthermore, notification of an event enables information processing to be performed without confirmation of a state by a loop process in the program and therefore without delay in timing after a problem occurs.

A failure prediction method according to a twenty-fifth aspect is:

the failure prediction method according to any of the twenty-first to twenty-fourth aspects; wherein the diagnosis by each of the devices of the device's own state is performed when an event occurs.

Accordingly, as in the ninth aspect, a processing load on each device can be reduced in comparison with the case diagnosis is performed every time power is on. Especially, when the diagnosis is performed by a dedicated diagnosis program and hardware resources provided for the device is borrowed for use to execute the program, a more significant effect can be obtained. Furthermore, notification of an event enables information processing to be performed without confirmation of a state by a loop process in the program and therefore without delay in timing after a problem occurs.

A failure prediction method according to a twenty-sixth aspect is:

the failure prediction method according to any of the twenty-first to twenty-fifth aspects; wherein the notification by each of the devices of the results of diagnosis of the device's own state is periodically performed.

Accordingly, as in the tenth aspect, a processing load on each device or network traffic required for notification can be reduced if information accumulated in the device is collectively and periodically notified.

A failure prediction method according to a twenty-seventh aspect is:

the failure prediction method according to any of the twenty-first to twenty-sixth aspects; wherein the detection of a state related to a failure by the failure prediction section of the device management server is performed based on a process leading to a failure of the device.

Accordingly, as in the eleventh aspect, by utilizing a process leading to a failure as information for analyzing a cause of a failure, it is possible to easily find a cause of a failure due to an unexpected factor.

A failure prediction system according to a twenty-eighth aspect is:

a failure prediction system comprising multiple devices and a device management server for managing the devices via a network; wherein each of the devices comprises device diagnosis section for continuously diagnosing the device's own state to notify the device management server of the diagnosis results via a network periodically or as needed, and the device management server comprises failure prediction section for finding a state related to a failure from a device with the failure and a process leading to the failure, based on the diagnosis results sent by the device diagnosis section of each of the devices, performing focused diagnosis as for the state related to a failure, and predicting a device with a failure tendency based on the new diagnosis results.

That is, the failure prediction system according to this invention does not predict a device with a failure tendency from diagnosis results obtained by diagnosing each device only based on predetermined diagnosis settings, but predicts a device with a failure tendency from diagnosis results obtained by performing feedback of the diagnosis results to specify more optimal diagnosis settings.

As a result, it is possible not only to easily grasp an unexpected factor, such as an operation or a state related to a failure, but also to immediately utilize the results for new failure prediction. Therefore, it is possible to accurately predict a failure due to an unexpected factor as well as a failure due to an expected factor.

A failure prediction system according to a twenty-ninth aspect is:

a failure prediction system comprising multiple devices and a device management server for managing the devices via a network; wherein each of the devices comprises device diagnosis section for continuously diagnosing the device's own state with a diagnosis program sent by the device management server to notify the device management server of information on the diagnosis periodically or as needed, and the device management server comprises failure prediction section for finding a state related to a failure from a device with the failure and a process leading to the failure, based on the diagnosis results sent by the device diagnosis section of each of the devices, sending a new diagnosis program for performing focused diagnosis as for the state related to a failure to each of the devices, and predicting a-device with a failure tendency based on diagnosis results notified by the new failure diagnosis program.

That is, according to this invention, the diagnosis program sent by the device management server is used to diagnose the device, and an effect similar to that of the invention 28 can be easily achieved only by changing diagnosis settings for the diagnosis program via a network as appropriate.

In a failure prediction system according to a thirtieth aspect, device diagnosis section of the device comprises: a communication part for providing a function of communicating with the device management server; a program execution part for executing a diagnosis program for diagnosing the state of each part of the device; a storage part for preserving settings of the program and diagnosis results, and a detection part for detecting the state of each part of the device.

By adopting such a configuration, it is possible not only to accurately diagnosis the state of each part of the device to send the diagnosis results to the device management server but also to easily receive new diagnosis settings to perform accurate failure diagnosis.

In a failure prediction system according to a thirty-first aspect, failure prediction section of the device management server comprises: a communication part for providing a function of communicating with the device, a data processing part for processing diagnosis results sent by each of the devices to create failure occurrence tendency information and creating a new diagnosis program, a storage part for storing information on the device and the diagnosis results, and a search part for searching for a device corresponding to the failure occurrence tendency information.

By adopting such a configuration, it is possible for the device management server to specify accurate diagnosis settings and create failure occurrence tendency information from diagnosis results sent by each device according to the diagnosis settings, and therefore more accurate failure prediction can be performed.

In a failure prediction system according to a thirty-second aspect, each of the devices further comprises operation restriction section for restricting a part or all of operations of the device in response to a signal from the device management server, though not especially specified in the claims similarly to the twenty-eighth aspect.

By adopting such a configuration, the user of the device cannot perform such an operation that may cause a failure and, therefore, a failure of the device can be prevented from occurring.

As a result, a repair cost required when a failure occurs can be reduced, which contributes to cost reduction.

In a failure prediction system according to a thirty-third aspect, each of the devices further comprises warning section for giving a warning to the effect that a failure of the device is predicted or that operations are restricted, in response to a signal from the device management server.

Accordingly, the user of the device is prevented from performing such an operation that may cause a failure, and an effect similar to that of the fifth aspect can be obtained.

In a failure prediction system according to a thirty-fourth aspect, the device is a printer.

Accordingly, it is possible to accurately predict a failure for each of printers connected on a network.

A failure prediction program according to a thirty-fifth aspect is:

a program for realizing a failure prediction system comprising multiple devices and a device management server for managing the devices via a network, with a computer; wherein each of the devices comprises device diagnosis section for continuously diagnosing the device's own state to notify the device management server of the diagnosis results via the network periodically or as needed; and the device management server comprises failure prediction section for finding a state related to a failure from a device with the failure and a process leading to the failure, based on the diagnosis results sent by the device diagnosis section of each of the devices, performing focused diagnosis as for the state related to a failure, and predicting a device with a failure tendency based on the new diagnosis results.

Accordingly, it is possible to realize accurate failure prediction for a device on a network, on software, and therefore it is possible to more economically realize failure prediction in comparison with realization by performing failure prediction with dedicated hardware.

A failure prediction program according to a thirty-sixth aspect is:

a program for realizing a failure prediction system comprising multiple devices and a device management server for managing the devices via a network, with a computer; wherein each of the devices comprises device diagnosis section for continuously diagnosing the device's own state with a diagnosis program sent by the device management server to notify the device management server of information of the diagnosis periodically or as needed, and the device management server comprises failure prediction section for finding a state related to a failure from a device with the failure and a process leading to the failure, based on the diagnosis results sent by the device diagnosis section of each of the devices, sending a new diagnosis program for performing focused diagnosis as for the state related to a failure to each of the devices, and predicting a device with a failure tendency based on diagnosis results notified by the new failure diagnosis program.

Accordingly, as in the thirty-fifth aspect, it is possible to economically realize failure prediction of the device.

In a failure prediction program according to a thirty-seventh aspect, device diagnosis section of the device comprises: a communication part for providing a function of communicating with the device management server, a program execution part for executing a diagnosis program for diagnosing the state of each part of the device; a storage part for preserving settings of the diagnosis program and the diagnosis results; and a detection part for detecting the state of each part of the device.

Accordingly, it is possible to realize the thirty-fifth aspect and the like, and device diagnosis section provided for each device on software, and therefore it is possible to economically realize the function.

In a failure prediction program according to a thirty-eighth aspect, failure prediction section of the device management server comprises: a communication part for providing a function of communicating with the device, a data processing part for processing diagnosis results sent by each of the devices to create failure occurrence tendency information and creating a new diagnosis program, a storage part for storing information on the device and the diagnosis results, and a search part for searching for a device corresponding to the failure occurrence tendency information.

Accordingly, as in the thirty-seventh aspect, it is possible to realize failure prediction section provided for the device management server on software, and therefore it is possible to economically realize the function.

In a failure prediction method according to a thirty-ninth aspect, the state of multiple devices connected to a network is diagnosed; a state related to a failure is found from a device with the failure and a process leading to the failure, based on results of the diagnosis of each of the devices; focused diagnosis as for the state related to a failure is performed; and then a device with a failure tendency is predicted based on the new diagnosis results.

Accordingly, as in the twenty-eighth aspect, it is possible not only to easily grasp an unexpected factor but also to immediately utilize the results for new failure prediction.

Therefore, it is possible to accurately predict a failure due to an unexpected factor as well as a failure due to an expected factor.

In a failure prediction method according to a fortieth aspect, multiple devices connected to a network are diagnosed with a failure diagnosis program provided for each of the devices; a state related to a failure is found from a device with the failure and a process leading to the failure, based on the results of the diagnosis by each diagnosis program, a new diagnosis program for performing focused diagnosis as for the state related to the failure is sent to each of the devices; and a device with a failure tendency is predicted from diagnosis results notified by the new failure diagnosis program.

Accordingly, an effect similar to that of the twenty-eight aspect can be easily achieved only by changing the diagnosis settings for the diagnosis program via the network as appropriate.

In a failure prediction method according to a forty-first aspect, if a device with a failure tendency is predicted, then operations of the device is stopped, or a warning is given to the user of the device.

Accordingly, as in the thirty-second and thirty-third aspects, the user of the device cannot or does not perform such an operation that may cause a failure. Therefore, a failure of the device can be prevented from occurring.

BRIEF DESCRIPTION OF THE DRAWINGS

FIG. 9 is a flowchart showing a flow in a printer management server;

FIG. 10 shows related items to be monitored for failure positions;

FIG. 15 shows relation between each printer state and common diagnosis settings;

FIG. 16 shows relation between a particular printer state and new, common diagnosis settings;

DETAILED DESCRIPTION OF THE PREFERRED EMBODIMENTS

A preferred embodiment for implementing the present invention will be now described below with reference to the drawings.

Figure 1:
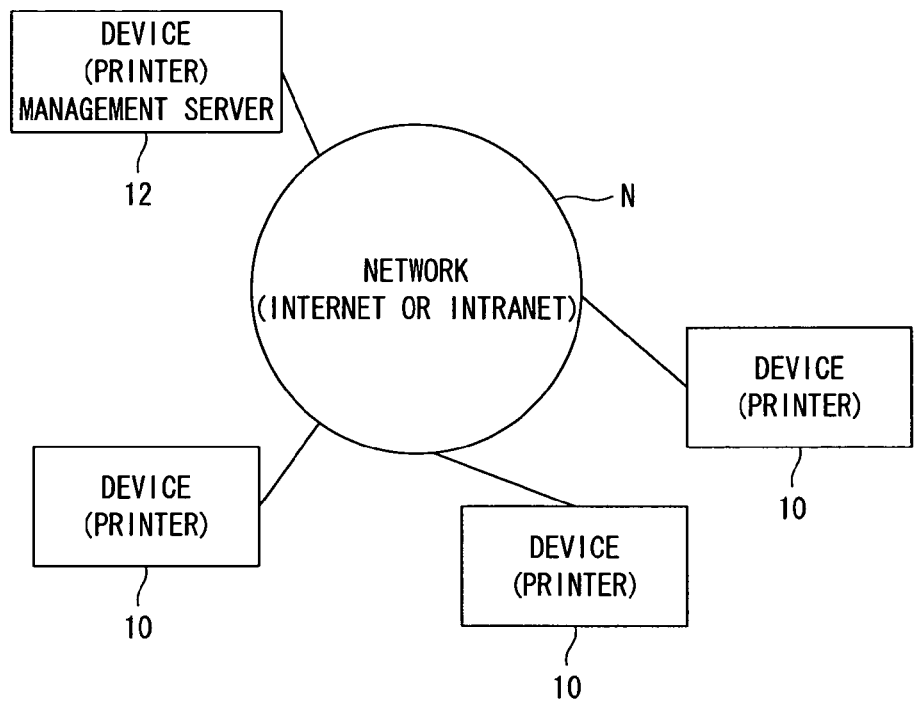
FIG. 1 shows an entire configuration of a failure prediction system.

FIG. 1 shows an embodiment of a failure prediction system according to the present invention.

As shown in the figure, the failure prediction system is mainly constituted with multiple devices 10, 10, . . . connected to a network N such as the Internet and an intranet, and a device management server 12 for managing the devices 10, 10, . . . via the network N. In this embodiment, an example will be described in which a printer, on which an application execution environment can be provided, is used as the device 10, and a printer management server for centrally managing the printers is used as the device management server 12.

Figure 2:
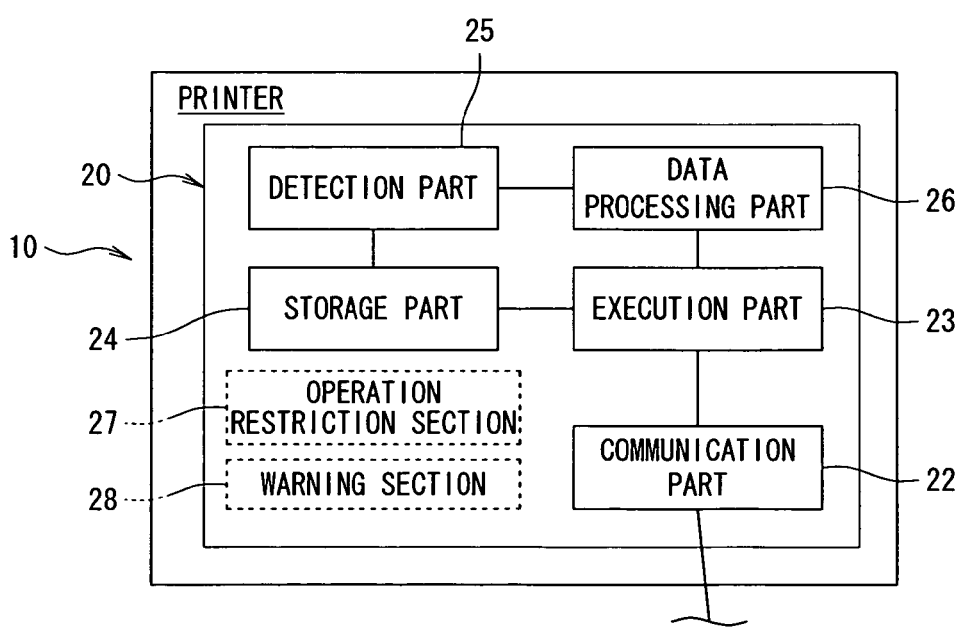
FIG. 2 is a block diagram showing device diagnosis section of a device.

The printer 10 is provided with device diagnosis section 20 for periodically diagnosing the utilization state, errors, failures and the like of the printer 10, in addition to the specific functions of a printer such as printing and paper feeding, as shown in FIG. 2. Results of diagnosis by the device diagnosis section 20 is notified to the printer management server 12 via the network N.

Specifically, the device diagnosis section 20 is mainly constituted with a communication part 22 for providing a function of communicating with the printer management server 12, a program execution part 23 for executing a predetermined diagnosis program to obtain the diagnosis results, a storage part 24 for storing the diagnosis results of and settings for the diagnosis program, a detection part 25 for detecting the function state and the like of each part of the printer, and a data processing part 26 for performing data processing specific to the printer, as shown in the figure.

That is, the communication part 22 provides a function of communicating with the device management server 12 to functions of obtaining from the device management server 12 a failure diagnosis program and the settings therefor, sending the results of diagnosis of the printing function to the device management server 12, and the like. The program execution part 23 performs functions of executing a failure diagnosis program in order to diagnose whether or not the printing function is normally operating, and processing the diagnosis results.

The storage part 24 consists of an internal storage device such as a semiconductor memory and a hard disk, and stores and preserves a diagnosis program, the settings therefor and the like.

The detection part 25 consists of multiple sensors provided for each part of the printer, and continuously detects a jam error, a feeder error, open/close states of a protection cover and the like.

Figure 3:
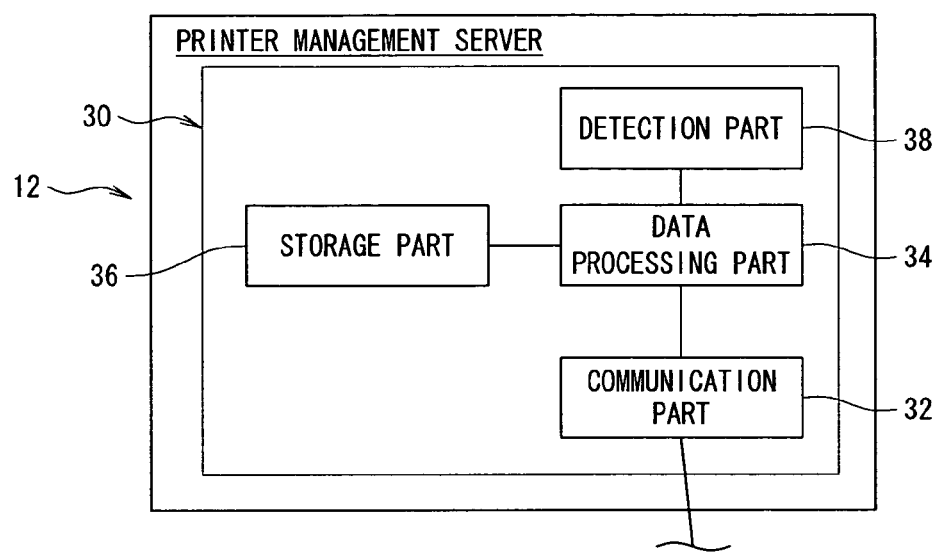
FIG. 3 is a block diagram showing failure prediction section of a device management server.

The printer management server 12 is provided with failure prediction section 30 for predicting the time when a failure may occur in a printer based on data notified by each of the printers 10, 10, . . . , in addition to the original functions such as distributed printing by the printers, central management of the printers and the like, as shown in FIG. 3. The failure prediction section 30 is mainly constituted with a communication part 32, a data processing part 34, a storage part 36 and a search part 38, as shown in the figure.

That is, the communication part 32 provides a function of communicating with each of the printers 10, 10, . . . to send a diagnosis program or new settings to each of the printers 10, 10, . . . and acquires diagnosis results from each of the printers 10, 10 . . . The data processing part 34 performs functions of monitoring whether a failure has occurred based on the diagnosis results, creating failure occurrence tendency information based on history information of printers in which a failure similar to that of the printer with a failure occurred, specifying new diagnosis settings for a printer with a tendency of causing a failure soon.

The storage part 36 consists of a storage device such as a semiconductor memory and a hard disk storage, and mainly stores and preserves information on each printer, and diagnosis results, failure occurrence tendency information and the like of the printer. The search part 38 searches for printers the symptom of which corresponds to the obtained failure occurrence tendency information, among all the printers.

Each of processing functions performed by the device diagnosis section 20 provided for the printer and the failure prediction section 30 provided for the printer management server 12 is specifically realized by a computer system constituted with hardware including a central processing unit, a main storage and the like and various dedicated software (processing programs) created for processing of communication, diagnosis, retrieval and the like.

Figure 4:
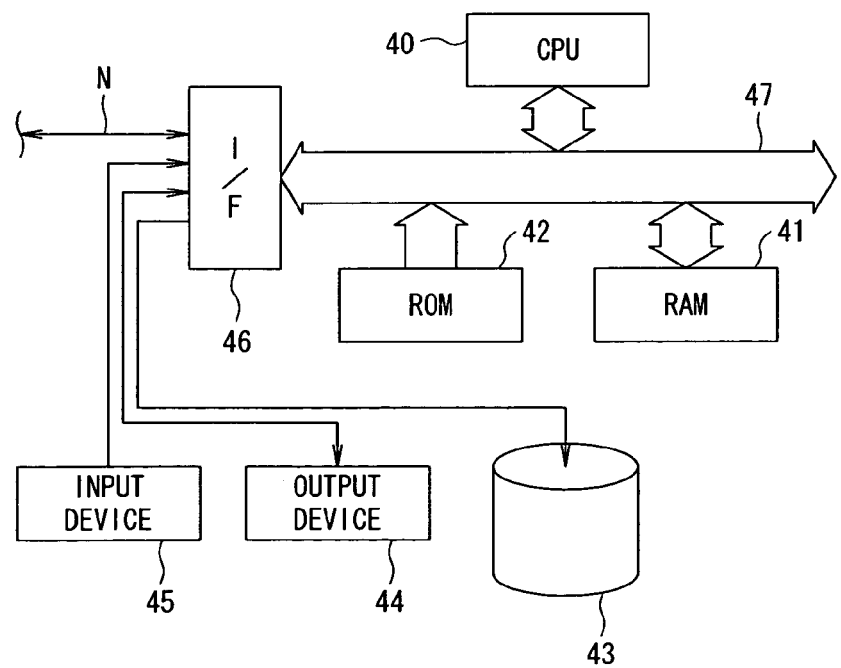
FIG. 4 is a block diagram showing a hardware configuration for realizing a system of the present invention.

That is, in the computer system for realizing each of the section 20, 30 and the like, for example, a CPU (central processing unit) 40 responsible for various controls and computations, a RAM (random access memory) 41 used as a main storage, a ROM (read only memory) 42 which is a storage device dedicated for reading, a secondary storage 43 such as a hard disk drive device (HDD) and a semiconductor memory, an output device 44 consisting of a monitor (such as an LCD (liquid crystal display) and a CRT (cathode-ray tube)) and the like, an input device 45 constituted with a keyboard, a mouse and the like, and an input/output interface (I/F) 46 therefor are connected via various internal and external buses 47 such as a processor bus, a memory bus, a system bus and an input/output bus, consisting of a PCI (peripheral component interconnect) bus, ISA (industrial standard architecture) bus or the like, as shown in FIG. 4.

Various control programs and data, which are provided in a recording medium such as a CD-ROM, a DVD-ROM and a floppy disk (registered trademark) or via the above-described communication network N, are installed in the secondary storage 43 and the like. The programs or data are loaded in the main storage 41 when necessary, and the CPU 40 performs predetermined controls and operations with the use of various resources according to the program loaded in the main storage 41. The processing results (processed data) is then outputted and displayed on the output device 44 via the bus 47, and the data is stored and preserved (updated) in a database formed in the secondary storage 43 as appropriate.

An example of a failure diagnosis method, for which a failure diagnosis system configured as described above is used, will be now described with reference to flowcharts in FIGS. 5 to 9.

Figure 5:
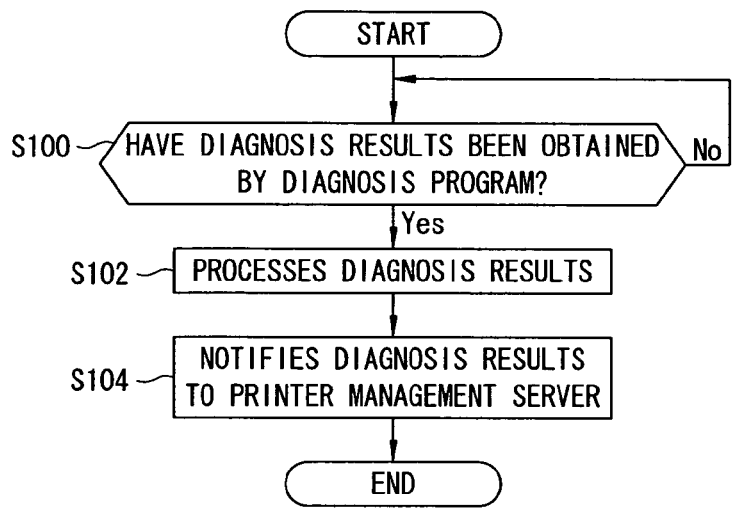
FIG. 5 is a flowchart showing a flow of diagnosis results in a printer.

FIG. 5 is a flowchart showing operation of each of the printers 10, 10, . . .

As shown in FIG. 5, each of the printers 10, 10, . . . periodically executes a failure diagnosis program (first diagnosis program) preserved in advance in the storage part 24 to diagnose each part of the printer and obtain the diagnosis results (step S100). If the diagnosis results are obtained (YES), then the diagnosis results are processed (step S102) and the results are notified to the printer management server 12 via the network N (step S104).

In this case, the processing of the diagnosis results at step S102 is performed based on the settings for processing diagnosis results which have been set for the printer 10. For example, settings may be so specified that new diagnosis items should be created by collecting multiple diagnosis result items, or that specified diagnosis items should be notified irrespective of the state.

Figure 6:
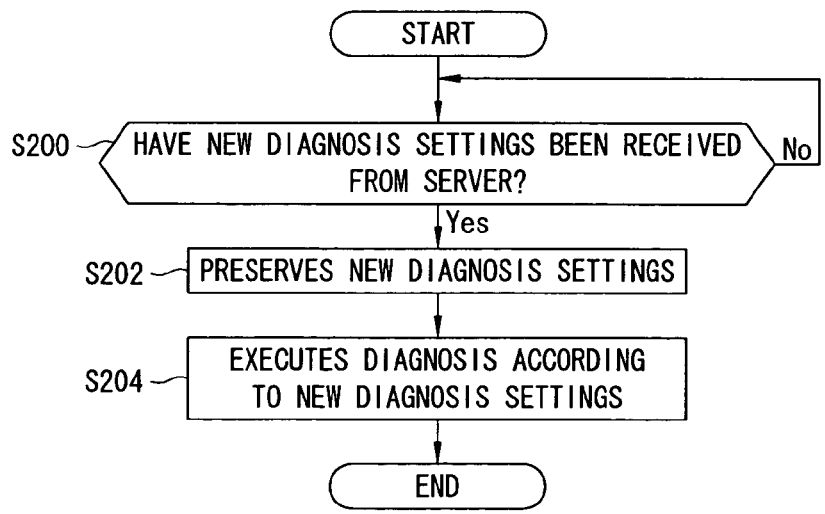
FIG. 6 is a flowchart showing a flow of new diagnosis in a printer.

The diagnosis settings for a failure diagnosis program can be changed by the printer management server 12 as appropriate. That is, as shown in FIG. 6, each of the printers 10, 10, . . . continuously monitors whether or not new diagnosis settings have been received from the printer management server 12 (step S200). If new diagnosis settings have been received (YES), then the new diagnosis settings are preserved in the storage part 24 (step S202), and a diagnosis program (second diagnosis program) is periodically executed according to the new diagnosis settings to periodically notify the diagnosis results.

Figures 11, 12:
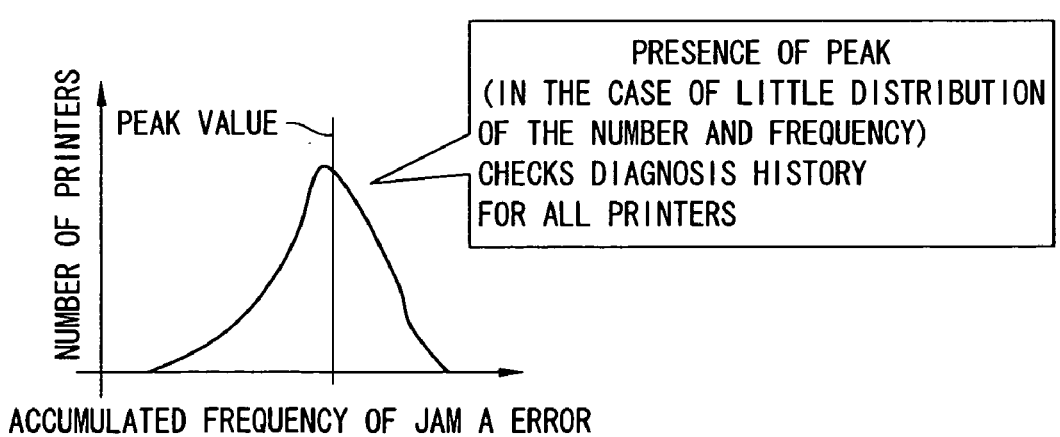
FIG. 11 shows an example of log data for a printer.
FIG. 12 is a distribution chart showing the accumulated frequency in a diagnosis history in a printer with a failure.

For example, when six positions of "Feeding Condition" 100, "Jam A" 101, "Jam B" 102, "Feeder" 103, "Discharger" 104 and "Feeding Motor" 105 are set as points to be diagnosed as shown in FIG. 10, the diagnosis program of each of the printers 10, 10, . . . monitors presence/absence of an error, a related event ("NoPaper", "Cover A Open" "Cover B Open", "Feeder Open", "Discharger Open" and "Motor Temperature") and the value ("accumulated frequency" for the diagnosis positions 100 to 104 and "the number of times a threshold temperature (100° C.) was exceeded" for the positions 105) for the positions, obtains the monitoring results as a diagnosis history (log data) as shown in FIG. 11, and then periodically sends the information to the printer management server 12 as diagnosis results.

The example in FIG. 11 shows that a "Jam A" error occurred twice in succession at 9:10 and 10:10 on Nov. 9, 2002; after that, at 12:10, the "Cover A" near the "Jam A" was opened by the user; after that, at 20:00, communication is "off-line" (stopped); and at 10:10 on the next day, a "Feeder" error occurred. Furthermore, the temperature of the "Feeder Motor" of the printer 10 reached 60° C. at 12:30 on the day when the error occurred at the "Feeder" (November 10) and after 15 minutes (at 12:45), the temperature of the "Feeder" reached 110° C. This diagnosis history is sent to the printer management server 12 as diagnosis results for the printer 10 for a certain period of time.

Figure 7:
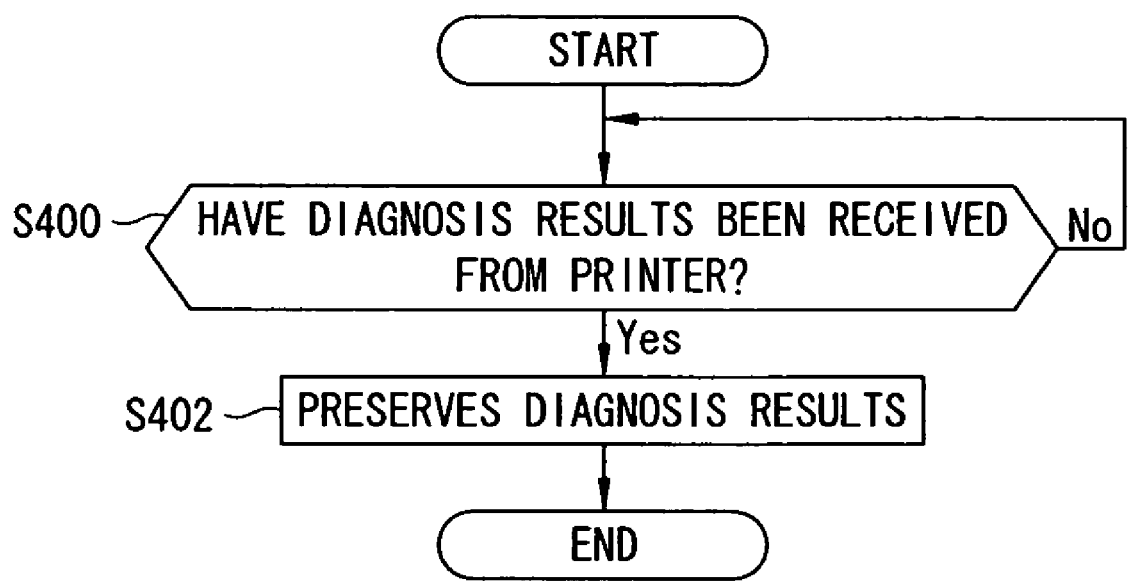
FIG. 7 is a flowchart showing a flow in a printer management server.
Figure 8:
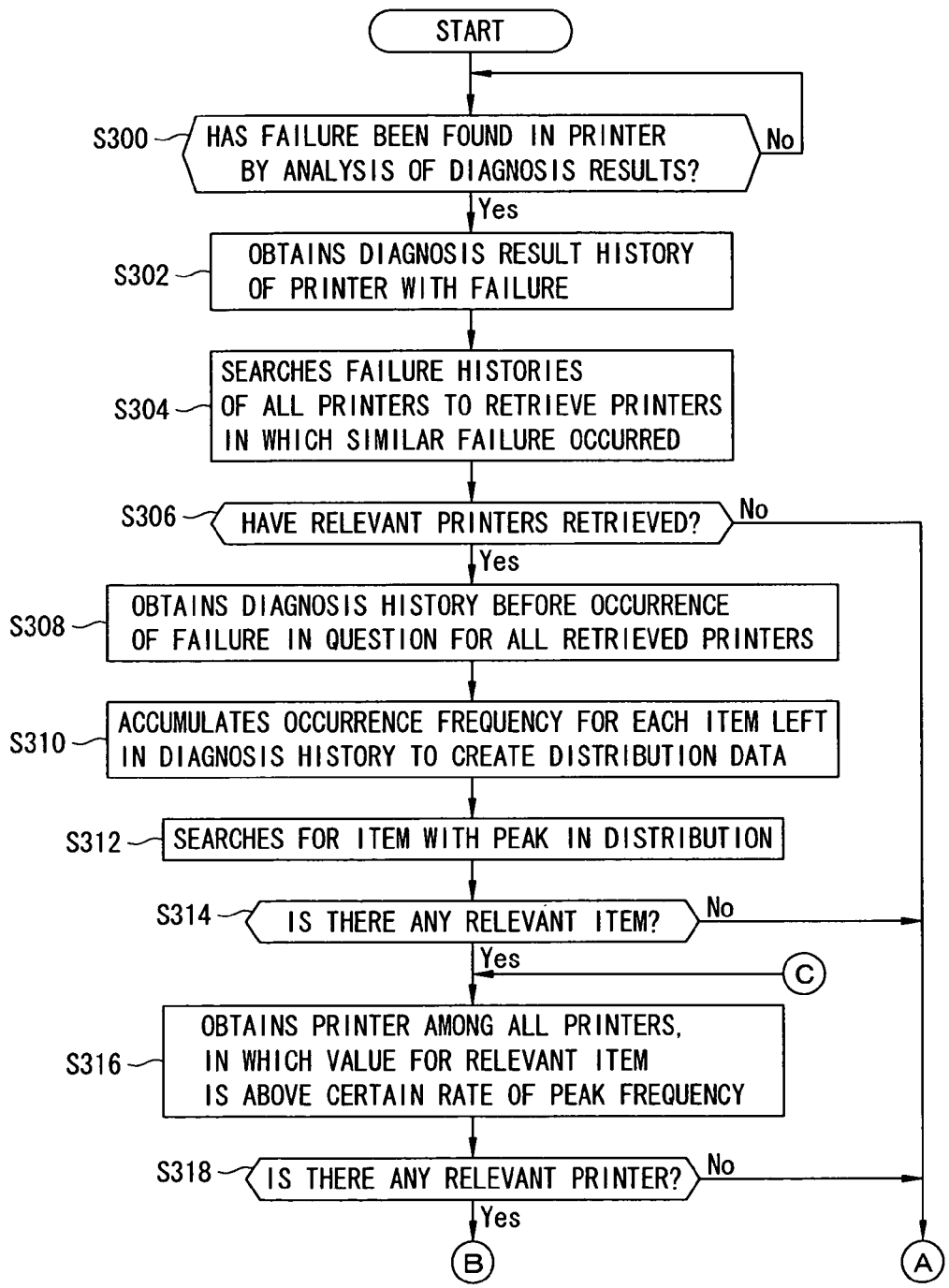
FIG. 8 is a flowchart showing a flow in a printer management server.

FIGS. 7 to 9 are a flowchart showing operation of the printer management server 12.

The printer management server 12 continuously monitors whether or not diagnosis results have been received, which are sent from each of the printers 10, 10, . . . via the network N (step S400) as shown in FIG. 7. If they are received (YES), then the diagnosis results are preserved in its storage part 36 (step S402).

Then the printer management server 12 analyzes the preserved diagnosis results to determine whether or not there is any printer in which a failure has occurred (step S300) as shown in FIG. 8. If there is found any printer with a failure (YES), then the history of diagnosis results for the printer is obtained (step S302). Then, such printers, in which a failure similar to that of the printer with a failure occurred, are searched for among all the printers (step S304).

If relevant printers are retrieved (YES) as a result of the search (step S306), then the diagnosis history before the failure in question occurred is obtained for all the retrieved printers (step S308). The occurrence frequency for each of the items left in the diagnosis history is accumulated to create distribution data (step S310), and then an item with a distribution peak is searched for (step S312).

Figure 13:
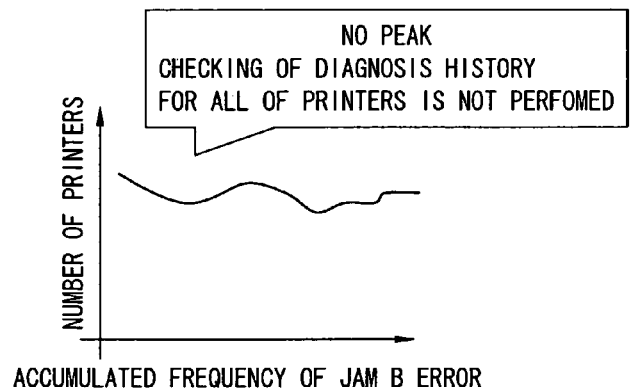
FIG. 13 is a distribution chart showing the accumulated frequency in a diagnosis history in a printer with a failure.

FIGS. 12 and 13 are associated with steps S310 and S312 and show an example of distribution of accumulated frequency in a diagnosis history of a printer with a failure.

For example, when there is a peak in the accumulated frequency of the "Jam A" error, as shown in FIG. 12, the diagnosis history is checked for all the printers. However, when there is no peak in the accumulated frequency of the "Jam B" error, as shown in FIG. 13, checking of the diagnosis history for all the printers Is not performed.

If there is found any relevant item (YES) as a result of the search (step S314), then printers, for which the value of the relevant item is above a certain rate of the peak frequency, are obtained among all the printers (step S316).

Figure 14:
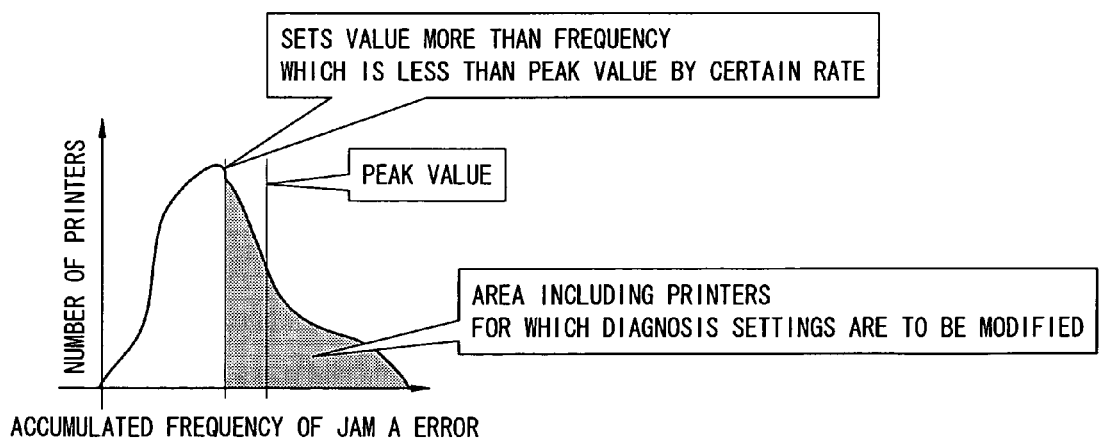
FIG. 14 is a graph showing the accumulated frequency in diagnosis histories of all printers.

FIG. 14 is associated with step S316 and shows an example of distribution of accumulated frequency in diagnosis histories of all the printers. A value above the value less than the peak value by a certain rate is set as a threshold, and printers with the value above the threshold (printers included in the painted portion in the figure) are selected as those for which diagnosis settings are to be modified.

It is then determined whether or not there is any relevant printer (step S318). If there is found any relevant printer (YES), then a table for related items to be monitored is referred to for the found printers to create new diagnosis settings for increasing monitoring frequency for related items to be monitored by a certain rate for relevant items or decreasing monitoring frequency by a certain rate for irrelevant items (step S320). FIG. 10 is associated with step S320 and shows an example of the table for related items to be monitored for a failure positions.

After that, it is determined whether or not the next relevant item exists (step S322). If it does not exist (YES), new diagnosis settings are sent to the intended printer and the process ends.

If there is not found a relevant printer (NO) at step S306, or if there is no relevant item (NO) at step S314, or if there is no relevant printer (NO) at step S318, then the process ends without doing anything. If it is determined that the next item exists (YES) at step S322, then the process returns to step S316 and the same processing is repeated until there is found no such item.

FIGS. 15 and 16 show a particular example of failure prediction settings for the printer management server 12.

That is, FIG. 15 shows that there are five printers (printers 1 to 5) to be managed by the printer management server 12; there are four diagnosis items ("No Paper", "Jam A", "Jam B" and "Feeder") for each of the printers 1 to 5; and the time interval for diagnosis to be performed for the items is set as "every 1 minute" according to common diagnosis settings 200.

By analyzing the diagnosis results for each of the printers 1 to 5, it is seen that a failure has occurred at the "Feeder" in the printers 1 and 2, and the "Feeder" is normally operating in the other printers 3 to 5. It is also seen that the frequency of the "Jam A" error has reached thirty times at both of the printers 1 and 2 with a failure at the "Feeder", while the "Jam A" error has occurred less than thirty times at the printers 3 to 5 in which the "Feeder" is normally operating.

It can be presumed not only that the failure at the "Feeder" is in a close relation with the frequency of the "Jam A" error from this result but also that the a failure occurs at the "Feeder" when the frequency of the "Jam A" error has reached thirty times.

Consequently, as shown in FIG. 16, the printer management server 12 changes the diagnosis settings as the new common diagnosis settings 201 by shortening the diagnosis time interval for the "Jam A" which is in close relation with the failure of the "Feeder", from "every 1 minute" to "every 30 seconds" and lengthening the diagnosis time interval for the "No Paper" and the "Jam B", which are in low relation with the failure, from "every 1 minute" to "every 5 minutes", and notifies the settings to each printer. The time interval for the "Feeder Motor Temperature" is set as "every 1 minute" without change.

It is also presumed that a failure may possibly occur soon in the printer 5 since the frequency of "Jam A" errors is "28 times" near to "30 times", a frequency which may possibly cause a failure.

Figures 17, 18:
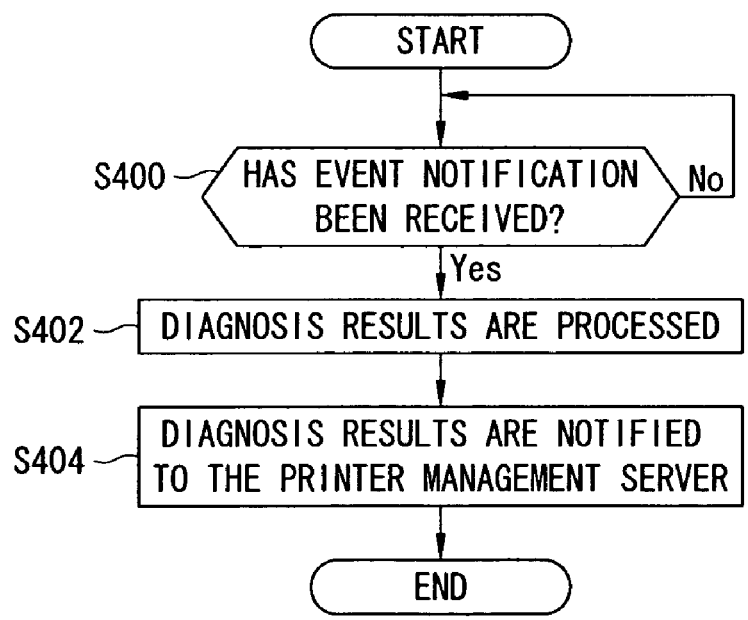
FIG. 17 shows an example of operation restriction.
FIG. 18 is a flowchart showing a flow of diagnosis results in a printer.

To cope with this, the user of the printer 5 may be notified to that effect; opening/closing of the "Cover A" associated with the "Jam A" error may be inhibited in order to prevent the user from performing such an operation that may cause a failure, that is, an action which may increase the frequency of the "Jam A" error, as shown in FIG. 17; or use of the feeder is controlled via the network N. Accordingly, a failure of the device can be prevented from occurring.

Specifically, as shown in FIG. 2, by further providing each device 10 with operation restriction section 27 for restricting a part or all of operations of the device in response to a signal from the device management server 12, or warning section 28 for giving a warning to the effect that a failure in the device is predicted or operations of the device is restricted, for example, a message with letters or a warning with a sound or a light, in response to a signal from the device management server 12, the user of the device is prevented from performing such an operation that may cause a failure.

A restriction method by the operation restriction section 27 includes, but not limited to, inhibition of opening/closing of a discharge tray, stop of receiving of data to be printed, stop of the network server function of a Web server and the like, invalidation of an operation by an operation button on the printer, stop of display on a display panel, and inhibition of removal of a toner cartridge, sensitized material, a waste toner cartridge and an ink cartridge, for example.

Thus, it is possible to reduce a repair cost required when a failure occurs and therefore contribute to cost reduction.

In this way, the failure prediction system according to the present invention does not predict a printer with a failure tendency based on diagnosis results obtained by diagnosing each printer only based on predetermined diagnosis settings, but predicts a device with a failure tendency by performing feedback of the diagnosis results to specify more dynamically optimal diagnosis settings and collecting and analyzing diagnosis results based on the settings.

As a result, it is possible not to easily grasp a failure tendency due to expected factors to cause a failure as well as due to unexpected factors, for example, in the case of a new product for which sufficient failure data has not been obtained. Furthermore, it is also possible to immediately utilize the grasped results for new failure prediction.

Thus, by adopting this system, it is possible to accurately predict not only a failure due to expected factors but also a failure due to unexpected factors, and thereby timely and high-quality maintenance services can be provided.

Furthermore, as for a device in which a failure is about to occur, its status before the failure can be grasped very accurately since a diagnosis level can be variable.

In addition, it is possible to identify parts with little necessity for monitoring for failure prediction and decrease the frequency of the monitoring, and thereby a load on the device and an analysis load in the device management server can be reduced.

In this embodiment, states to be diagnosed includes "jam", "opening of a cover", and "paper jam", and the states shown below can be also included.

1. the number of sheets to be printed (for each paper kind, each size and each color), printing time; 2. kind of processing data to be printed, processing time and processing resources (rate of CPU occupied, rate of memory used); 3. remaining amount of toner and ink; 4. time for use of sensitized material; 5. time for use of transfer unit; 6. the number of waste toner cartridges used; 7. time for use of fuser, temperature; 8. output amount, time for use, model number and lot number (serial number) of ink; 9. time for use and tension of belt; 10. time for use, temperature, torque, number of revolutions of motor; 11. service call history, and the like.

As for timing for obtaining of the diagnosis results by a diagnosis program as shown in FIG. 5, the diagnosis results may be obtained during operation of a printer (while power is on). However, if the diagnosis results are obtained in a certain cycle, that is, periodically, a processing load on the program side can be reduced. Especially, when a part of functions of the CPU, the RAM and the like provided for the device 10 are borrowed for use in time sharing as hardware resources to execute the diagnosis program, a more significant effect can be obtained.

The diagnosis results may be obtained by a diagnosis program when an event is notified. When a hardware failure occurs in a printer, the printer hardware can notify software of an event. For example, as in the case of Trap in the SNMP (Simple Network Management Protocol), which is a protocol for exchanging network management information such as failure information and traffic information, description of event occurrence can be registered in advance so that a program can receive an event notification when a problem occurs. An event notification can be also received when any problem occurs in data processing in software.

That is, the state of a printer may be obtained by waiting for notification of an event from hardware/software in addition to monitoring the state of the printer in a predetermined cycle.

FIG. 18 shows a process flow on the printer side, in which the diagnosis results are obtained by a diagnosis program when an event is notified as described above. First, the device diagnosis section 20 monitors whether or not an event notification has been received, at the first step S400. If it is determined that the event notification has been received (YES), then the process proceeds to the next step S402, where the diagnosis results are processed. The diagnosis results are then notified to the printer management server 12 at the next step S404.

The diagnosis history (log data) to be notified from each device to the server may include not only digital information such as information indicating "good status" and "bad status" but also analog information such as a feeder motor temperature (60° C.) below the threshold for the feeder motor temperature (100° C.), as shown in FIG. 11. That is, by notifying analog information, it is possible to utilize the past analog diagnosis results obtained in a good condition for investigation of a cause which may cause a bad condition to give a feedback of diagnosis settings to a device.

The following may be adopted as diagnosis levels in addition to those used in the embodiment: (1) as an example of increasing the diagnosis level for the "Jam A", the diagnosis settings may be so changed that the motor temperature is obtained as new diagnosis information related to operation of the "Feeder", in addition to the example increasing the frequency from "every 1 minute" to "every 30 seconds"; and (2) as an example of the diagnosis level for operation of the "Feeder", more detailed information may be obtained for the "motor temperature", "motor torque", "motor revolution speed" and "drive belt tension" in that order.

Though, in this embodiment, an example has been described in which a printer is used as the device 10 to be managed by the device management server 12, the present invention is not limited thereto and can be immediately applicable to a projector, scanner, complex machine, digital camera, copying machine and the like, as well as equipment suitable for a network, such as a mobile telephone and PHS (Personal Handyphone System—registered trademark), PDA (Personal Digital Assistant), exchange, NCU (Network Control Unit), router, hub, bridge, gateway, and POS (Point Of Sale) terminal. That is, the present invention can be applied to almost any device only if it is provided with a function of obtaining the state thereof (such as a sensor) and can be connected to a wired or wireless network and electronically controlled, and the present invention can be also applied to a vehicle such as a car, a motorcycle, an electric train and an aircraft, medical equipment, machine tools and the like.

In the embodiment described above, a communication protocol to be used for communication between the device management server 12 and the device 10 is not particularly limited, and the TCP/IP protocol, a standard protocol for the Internet, is naturally used in the case where the Internet is utilized, and a particular protocol such as the Apple Talk/ Ether Talk (registered trademark), the NetBEUI/NetBIOS (registered trademark), and the SPX/IPX (registered trademark) can be used in the case of a LAN in which equipment from a particular vendor is exclusively used.

For example, in the case of the TCP/IP, in addition to the TCP (Transmission Control Protocol) for establishing connection between the device management server 12 and the device 10 to ensure reliable communication, the UDP (user Datagram Protocol) which is a connectionless-type protocol for providing efficient communication, and the IP (Internet Protocol) which is a protocol for sending a packet to a predetermined destination via a path among a lot of paths, there are frequently used protocols such as the Telnet (Telecommunication Network) which is a protocol for remotely controlling the other terminal via a network, the FTP (File Transfer Protocol) which is a protocol for transferring a file utilizing the Telnet, the NFS (Network File System) which is a protocol for providing a transparent file access function for other computers, the ARP and RARP (Address Resolution Protocol, Reverse ARP), the SLIP and PPP (Serial Line Protocol, Point to Point Protocol), the RIP and OSPF (Routing Information Protocol, Open Shortest Path First), the RSVP (Resource Reservation Protocol), the IPSec (IP security Protocol), the IGMP (Internet Group Management Protocol), the NTP (Network Time Protocol) and the like.

As the storage parts 24 and 36 for preserving a control program and various data, a recording medium which can be exchanged and distributed as appropriate, including a magnetic-storage type storage medium such as FD, HD and MD, an optical-reading type storage medium such as CD, CDV, LD and DVD, and a computer readable medium such as a magneto-optic storage medium, including MO, can be used in addition to a hard disk device and a semiconductor storage medium.

The entire disclosure of Japanese Patent Application Nos. 2002-369,790 filed Dec. 20, 2002 and 2003-379,508 filed Nov. 10, 2003 are incorporated by reference.

What is claimed is:

1. A failure prediction system comprising:
multiple devices; and
a device management server managing the multiple devices via a network;
wherein each of the multiple devices includes a device diagnosis section for diagnosing a state of the device and to send first diagnosis results obtained by the diagnosing to the device management server; and
the device management server includes a failure prediction section for recognizing a state related to a failure based on the first diagnosis results sent by the device diagnosis section of each of the devices, performing failure diagnosis as for the recognized state related to a failure, and predicting a failure in a device with a failure tendency based on second diagnosis results obtained by the failure diagnosis;
the device diagnosis section of the device comprising:
a communication part for communicating with the device management server;
a program execution part for executing first and second diagnosis programs for diagnosing the state of parts of the device;
a storage part for preserving settings of the first and second diagnosis programs and the first and second diagnosis results; and
a detection part for detecting the state of parts of the device.

2. The failure prediction system according to claim 1 wherein the failure prediction section of the device management server comprises:
a communication part for communicating with the device;
a data processing part for creating failure occurrence tendency information showing a tendency of a state related to a failure based on the first diagnosis results sent by each of the devices and creating the second diagnosis program;
a storage part for storing the information on the device and the diagnosis results; and
a search part for searching for a device corresponding to the failure occurrence tendency information.

3. The failure prediction system according to claim 1 wherein each of the devices comprises an operation restriction section for restricting a part or all of operations of the device in response to a signal from the device management server.

4. The failure prediction system according to claim 1 wherein each of the devices comprises a warning section for giving a warning that at least one of a failure of the device is predicted and operations are restricted, in response to a signal from the device management server.

5. The failure prediction system according to claim 1 wherein the device comprises a printer.

6. The failure prediction system according to claim 1 wherein the diagnosis by each of the devices of the state of the device is periodically performed.

7. The failure prediction system according to claim 1 wherein the diagnosis by each of the devices of the state of the device is performed when an event occurs.

8. The failure prediction system according to claim 1 wherein the notification by each of the devices of the results of diagnosis of the state of the device to the device management server is periodically performed.

9. The failure prediction system according to claim 1 wherein the detection of a state related to a failure by the failure prediction section of the device management server is performed based on a process leading to a failure of the device.

10. A computer-readable media for storing a failure prediction program for realizing a failure prediction system comprising:
multiple devices; and
a device management server for managing the multiple devices via a network with a computer;
wherein each of the multiple devices includes a device diagnosis section for diagnosing a state of the device and to send first diagnosis results obtained by the diagnosing to the device management server; and
the device management server includes a failure prediction section for recognizing a state related to a failure based on the first diagnosis results sent by the device diagnosis section of each of the devices, performing failure diagnosis as for the recognized state related to a failure, and predicting a failure in a device with a failure tendency based on second diagnosis results obtained by the failure diagnosis;
the device diagnosis section of the device comprising:
a communication part for communicating with the device management server;
a program execution part for executing first and second diagnosis programs for diagnosing the state of parts of the device;
a storage part for preserving the settings of the first and second diagnosis programs and the first and second diagnosis results; and
a detection part for detecting the state of parts of the device.

11. The computer-readable media for storing the failure prediction program according to claim 10 wherein the failure prediction section of the device management server comprises:
a communication part for communicating with the device;
a data processing part for creating failure occurrence tendency information based on the diagnosis results sent by each of the devices and creating the second diagnosis program;
a storage part for storing the information on the device and the diagnosis results; and
a search part for searching for a device corresponding to the failure occurrence tendency information.

12. A failure prediction method comprising:
diagnosing a state of multiple devices connected to a network;
recognizing a state related to a failure based on first diagnosis results of the diagnosing of the multiple devices;
performing failure diagnosis as for the state related to a failure; and
predicting a failure in a device with a failure tendency based on second diagnosis results obtained by the failure diagnosis;
the diagnosing of the state of multiple devices comprising in each device:
communicating with a device management server;
executing first and second diagnosis programs for diagnosing the state of parts of the device;
storing settings of the first and second diagnosis programs and the first and second diagnosis results; and
detecting the state of parts of the device.

13. The failure prediction method according to claim 12 wherein when a device with a failure tendency is predicted, at least one of the following occurs:
- operations of the device with a failure tendency are stopped; and
- a warning is given to the user of the device after the prediction.

14. The failure prediction method according to claim 12 wherein the diagnosis by each of the devices of the state of the device is periodically performed.

15. The failure prediction method according to claim 12 wherein the diagnosis by each of the devices of the state of the device is performed when an event occurs.

16. The failure prediction method according to claim 12 wherein the notification by each of the devices of the results of diagnosis of the state of the device is periodically performed.

17. The failure prediction method according to claim 12 wherein the detection of a state related to a failure by the failure prediction section of the device management server is performed based on a process leading to a failure of the device.

* * * * *